April 13, 1954  D. A. ARONES  2,674,896
DRIVE UNIT FOR FLOOR POLISHING MACHINES AND THE LIKE
Filed Sept. 22, 1951  2 Sheets-Sheet 1
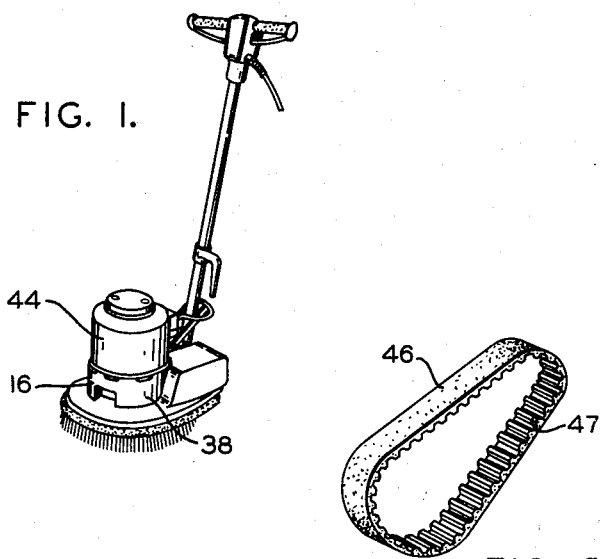
FIG. 1.
FIG. 5.
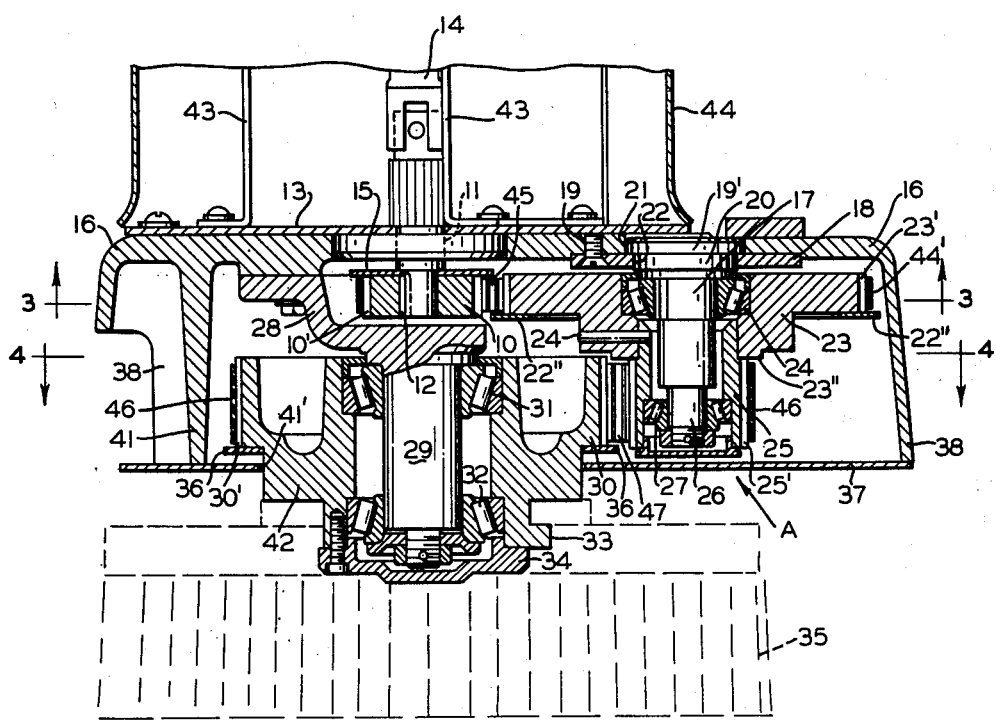
FIG. 2.
INVENTOR.
DANIEL A. ARONES
BY
*Jack H. Wicks*
ATTORNEY April 13, 1954 D. A. ARONES 2,674,896
DRIVE UNIT FOR FLOOR POLISHING MACHINES AND THE LIKE
Filed Sept. 22, 1951 2 Sheets-Sheet 2
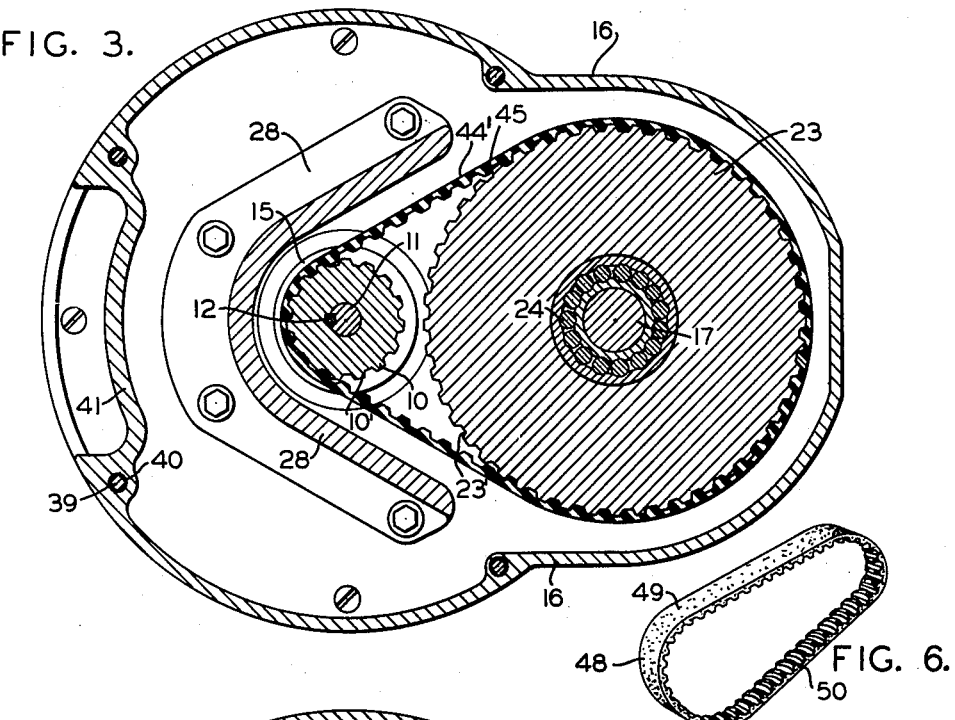
FIG. 3.
FIG. 6.
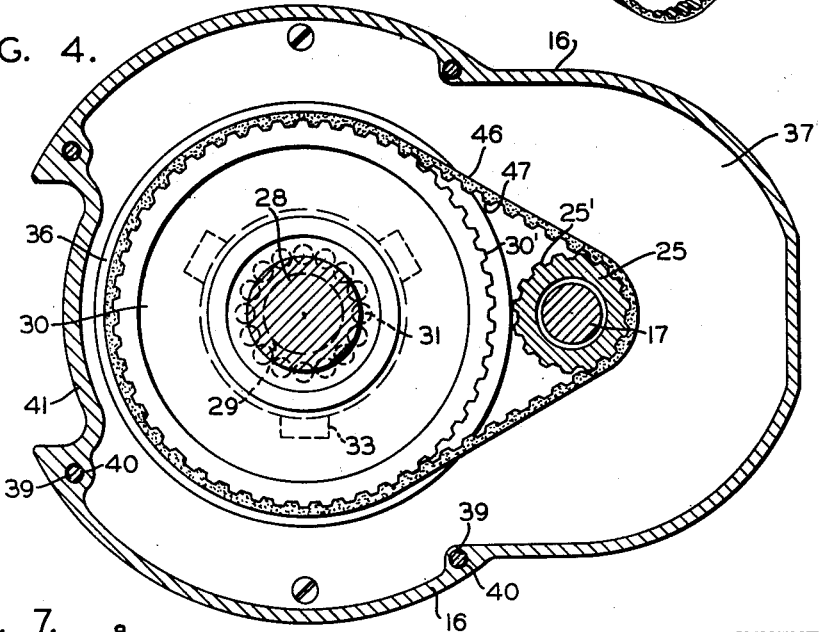
FIG. 4.
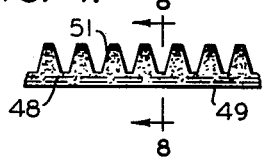
FIG. 7.
FIG. 8.
INVENTOR.
DANIEL A. ARONES
BY Jack N. Wicks
ATTORNEY Patented Apr. 13, 1954

2,674,896

UNITED STATES PATENT OFFICE 2,674,896

DRIVE UNIT FOR FLOOR POLISHING MACHINES AND THE LIKE

Daniel A. Arones, Minneapolis, Minn., assignor to Advance Machine Company, Minneapolis, Minn., a corporation of Minnesota Application September 22, 1951, Serial No. 247,867

4 Claims. (Cl. 74—217)

My invention relates to an improvement in a drive unit and more particularly to a drive unit used in a floor polishing machine and the like whereby a brush or polishing unit is driven by an electric motor mounted in a housing.

It is a primary object of my invention to provide a drive unit which not only brings about a reduction of motor shaft speed but which provides a positive driving mechanism giving an extremely even and quiet flow of power to a head member having a brush or other floor conditioning member mounted thereon.

It is also an object of my invention to provide a drive unit compact in form and which does not require grease or employ gears which require an oil bath for the same but which will run quietly and have long life. When grease is used in connection with a vertically mounted brush drive shaft it presents a problem because it can easily soil a floor or rug on which the machine is used.

It is a further object of my invention to provide a drive unit having a flexible toothed belt member connecting a driving gear to a free driven gear pulley together with a second flexible toothed belt connecting the driven gear pulley with a third rotatable gear pulley which has a brush mounting head secured thereto thereby producing a highly efficient drive unit at a relatively low manufacturing cost as compared to conventional gear drive units.

As a result of my new construction there is no vibration, the drive unit itself absorbing shock in the event that the machine is overloaded or a solid object is struck. In addition my new construction requires little maintenance or repair.

It is an additional object to provide guide members on said pulley gears whereby the toothed belt members are maintained in correct driving position.

I also provide a housing for my drive unit which supports an electric motor and which has a new and relatively simple internal support construction for the drive unit.

The invention will appear more clearly from the following detailed description when taken in connection with the accompanying drawings, showing by way of example a preferred embodiment of the inventive idea.

In the drawings forming part of the application:

Figure 1 is a perspective view of a floor polishing machine in which my drive unit is mounted.

Figure 2 is a partial longitudinal section through the drive unit and motor housing.

Figure 3 is a sectional view on the line 3—3 of Figure 2.

Figure 4 is a sectional view on the line 4—4 of Figure 2.

Figure 5 is a perspective view of one of the driving gear belts.

Figure 6 is a perspective view of an alternative form of driving gear belt.

Figure 7 is a side view of a portion of the gear belt shown in Figure 6.

Figure 8 is a sectional view on the line 8—8 of Figure 7.

My reduction driving unit A which is designed for use in floor polishing machines and the like is composed of a driving gear 10 which is keyed to the extension shaft 11 by means of the key 12 and has formed on the outer periphery thereof the teeth 10'. The extension shaft 11 is rotatably mounted on the motor support base plate 13 and coupled to the shaft 14 of an electric motor not shown in the drawings. The driving gear 10 has formed on the upper side thereof the circular gear belt guide member 15. I also provide the drive unit housing 16 on which the base plate 13 is mounted. The counter-shaft 17 is secured to the top portion of the housing 16 by means of the plate member 18 secured by the screws such as 19. The counter-shaft 17 has formed on the upper end thereof the annular shoulders 19' and 20 which abut the recesses 21 and 22 respectively formed in the housing 16 and the plate member 18.

The free driven gear pulley 23 is rotatably mounted on the counter-shaft 17 by means of the bearing 24 and has formed thereon the teeth 23'. The gear 23 also has formed on the lower side thereof the shoulder 23". I also provide a circular gear belt guide member such as 22" which is secured to the under face of the gear pulley 23. Secured to the driven gear 23 by means of the pin 24 is the counter-shaft driving gear pulley 25 which has the teeth 25' formed thereon. The shaft 17 is formed with the reduced end portion 26 which mounts the bearing 27 on which rotates the driving pinion gear 25.

Secured to the underside of the housing 16 adjacent the driving gear 10 is a depending flange member 28 to which is secured the centrally mounted counter-shaft 29 on which the driven gear pulley 30 rotates by means of the bearings 31 and 32. The gear pulley 30 has formed in the outer periphery thereof the teeth 30'. The gear pulley 30 has formed on the lower face thereof the lugs 33 which are adapted to engage recesses formed in a brush head such as 34 which mounts the brush 35. The gear pulley 30 also has the circular gear belt guide 36 secured to the under side face thereof.

To enclose the bottom of the housing 16 I provide the plate member 37 which is secured to the depending side portions 38 by means of bolts 39 which engage the threaded holes 40. The plate member 37 also abuts the depending casing portion 41 to aid in positioning the same and has formed therein the opening 41', through which the lower reduced end portion 42 of the gear pulley 30 extends.

The reduction drive unit A is driven by the shaft 14 of an electric motor not shown. The motor used is secured to the motor supports 43 which are secured to the base plate 13. The housing 44 is supported on the motor supports 43 and extends down to the base plate 13 thereby enclosing the motor.

To drive the driven gear pulley 23 I provide the flat flexible gear belt 44' which has formed on the inner surface thereof the teeth 45 which engage the teeth 10' of the driving gear 10 and the teeth 23' of the gear pulley 23. I further provide the flat flexible gear belt 46 which has formed on the inner surface thereof the teeth 47 which engage the teeth 25' of the driving pinion gear pulley 25 and the teeth 30' of the driven gear pulley 30 to thereby drive said driven gear pulley 30. The teeth formed in the gear belts and gear pulleys are formed to close tolerances. The gear belt guide member 15, together with the gear belt guide member 22" securely maintain the gear belt 44 on the gear pulleys 10 and 23. Also the gear belt guide member 36, together with shoulder 23" formed on the gear pulley 23 securely maintain the gear belt 46 on the driven gear pulley 30 and driving countershaft gear pulley 25.

I also provide another form of gear belt such as 48 which is formed with the flat outer surface 49 and the convex semi-circular body portion 50. The teeth 51 are formed in the convex body portion 50 and are adapted to engage teeth similarly formed in a gear pulley having a concave surface formed in the outer periphery thereof. It is apparent that the size of the gear pulleys disclosed above may be of various sizes depending upon the reduction in speed desired from the speed of the shaft 11 to the speed of the gear pulley 30.

The invention is not to be understood as restricted to the details set forth since these may be modified within the scope of the appended claims without departing from the spirit and scope of the invention.

Having thus described the invention, what I claim as new and desire to secure by Letters Patent is:

1. A reduction driving unit for floor polishing machines and the like including a driving gear, belt guide means formed on one side of said driving gear, a counter-shaft, a driven gear mounted on said counter-shaft adapted to be driven by said driving gear, belt guide means formed on one side of said driven gear opposite to that of said driving gear for cooperation therewith, shoulder belt guide means formed on said driven gear, a driving pinion gear mounted on said counter-shaft adjacent said driven gear and adapted to rotate therewith, a second counter-shaft mounted axially below said driving gear, a second driven gear mounted on said second counter-shaft, belt guide means formed on said second driven gear for cooperation with said shoulder belt guide means, and flexible gear belt means connecting said respective gears to provide a driving unit.

2. A driving unit including a housing, a driving gear pulley mounted on said housing, a counter-shaft spaced from the axis of said driving gear pulley and adapted to be rotated thereby through a pulley gear mounted thereon and a flexible toothed belt, a second driving gear mounted on said counter-shaft, an extended flange having one end secured to said housing and the other free end positioned axially with respect to said driving gear pulley, a second counter-shaft mounted on said free end of said flange and having a rotatable pulley gear member mounted thereon, and a flexible toothed belt connecting said second driving gear with said last mentioned pulley gear member on said second counter-shaft.

3. In a reduction drive unit, a driving pulley gear, a housing on which said driving pulley gear is mounted, a circular belt guide member secured to the upper surface of said driving gear, a counter-shaft mounted on said housing, a driven pulley gear rotatably mounted on said counter-shaft, a circular belt guide member secured to the under side of said driven gear for cooperation with said driving gear belt guide member, an annular shoulder formed on the under side of said driven pulley gear, a driving pulley gear secured to said driven pulley gear and rotatably mounted on said counter-shaft, a depending flange member secured to said housing, a second counter-shaft secured to said flange member, a second driven pulley gear rotatably mounted on said second counter-shaft, a circular belt guide member secured to the under side of said second driven pulley gear for cooperation with said shoulder of said first driven pulley gear, a toothed belt mounted on said first mentioned driving pulley gear within the confines of said circular belt guide members; and driven pulley gear, a toothed belt mounted on said second mentioned driving pulley gear and said second driven pulley gear within the confines of said guide member on said second driven pulley gear and said shoulder of said first driven pulley gear.

4. A reduction drive unit including a drive gear pulley, a housing on which said drive gear pulley is mounted, a counter-shaft mounted on said housing, a driven gear pulley rotatably mounted on said counter-shaft, a counter-shaft driving gear pulley secured to said driven gear pulley, depending free ended flange means secured to said housing at a point offset from said drive gear pulley, said free end of said flange being positioned axially with said drive gear pulley, a second counter-shaft secured to said free end of said flange means, a driven pulley gear rotatably mounted on said second counter-shaft, a flexible belt having teeth formed thereon and mounted on said drive gear pulley and said first mentioned driven gear pulley, and a flexible belt having teeth formed thereon and mounted on said counter-shaft driving gear pulley and said second mentioned driven gear pulley.

References Cited in the file of this patent

UNITED STATES PATENTS

| Number | Name | Date |
|---|---|---|
| 2,158,556 | Wesche | May 16, 1939 |
| 2,246,683 | Holt | June 24, 1941 |
| 2,397,312 | Forrest | Mar. 26, 1946 |
| 2,506,514 | McKelvey | May 2, 1950 |
| 2,507,852 | Case | May 16, 1950 |
| 2,534,679 | Place | Dec. 19, 1950 |
| 2,550,012 | Krafka | Apr. 24, 1951 |
| 2,566,579 | Nichols | Sept. 4, 1951 |

FOREIGN PATENTS

| Number | Country | Date |
|---|---|---|
| 249,055 | Germany | July 8, 1912 |